(12) United States Patent
Itoh et al.

(10) Patent No.: US 7,586,084 B2
(45) Date of Patent: Sep. 8, 2009

(54) OPTICAL FIBER PROBE, OPTICAL DETECTION DEVICE, AND OPTICAL DETECTION METHOD

(75) Inventors: Izumi Itoh, Tokyo (JP); Masato Takada, Kanagawa (JP); Taroh Terashi, Tokyo (JP); Motoichi Ohtsu, Kanagawa (JP); Takashi Yatsui, Kanagawa (JP); Motonobu Kourogi, Kanagawa (JP)

(73) Assignees: Ricoh Company, Ltd., Tokyo (JP); Kanagawa Academy of Science and Technology, Kawasaki-shi (JP)

( * ) Notice: Subject to any disclaimer, the term of this patent is extended or adjusted under 35 U.S.C. 154(b) by 230 days.

(21) Appl. No.: 11/547,032

(22) PCT Filed: Feb. 2, 2006

(86) PCT No.: PCT/JP2006/002205

§ 371 (c)(1),
(2), (4) Date: Oct. 3, 2006

(87) PCT Pub. No.: WO2006/083006

PCT Pub. Date: Aug. 10, 2006

(65) Prior Publication Data

US 2008/0073518 A1    Mar. 27, 2008

(30) Foreign Application Priority Data

Feb. 4, 2005    (JP)    ............... 2005-029652

(51) Int. Cl.
*G02B 6/26*    (2006.01)

(52) U.S. Cl. ............... 250/227.28; 385/31; 385/39

(58) Field of Classification Search ............... 250/227.3, 250/227.11, 227.31, 227.32, 227.28, 216, 250/227.29; 352/12, 43, 123, 31, 33, 39; 73/105
See application file for complete search history.

(56) References Cited

U.S. PATENT DOCUMENTS

| | | | |
|---|---|---|---|
| 6,700,852 B1 * | 3/2004 | Yamamoto et al. | ........... 369/100 |
| 2007/0018082 A1 * | 1/2007 | Ohtsu et al. | ............... 250/227.3 |

FOREIGN PATENT DOCUMENTS

JP    11 083872    3/1999

(Continued)

*Primary Examiner*—Stephen Yam
(74) *Attorney, Agent, or Firm*—Oblon, Spivak, McClelland, Maier & Neustadt, P.C.

(57) ABSTRACT

An optical detection device image is disclosed that allows fast measurements using near-field light at high resolution and high efficiency but without necessity of position alignment of an optical fiber probe. The optical detection device includes an optical fiber probe having a core for propagating light with an optical probe being formed at a front end of the core; a movement control unit to move the optical fiber probe to approach or depart from a sample; and a detection unit to detect light from the sample surface, wherein on the front end surface of the core of the optical probe, there are a first exit section on a peripheral side for emitting propagating light and a second exit section for seeping out the near-field light, the first exit section and the second exit section are formed in a concentric manner, and the tilt angle of the first exit section is different from the tilt angle of the second exit section.

23 Claims, 10 Drawing Sheets

FOREIGN PATENT DOCUMENTS

| | | |
|---|---|---|
| JP | 11 271339 | 10/1999 |
| JP | 2000 055818 | 2/2000 |
| JP | 2006 029831 | 2/2006 |
| WO | 98 10296 | 3/1998 |
| WO | 2005 003737 | 1/2005 |

* cited by examiner

OPTICAL FIBER PROBE, OPTICAL DETECTION DEVICE, AND OPTICAL DETECTION METHOD

TECHNICAL FIELD

The present invention relates to an optical fiber probe used in a scanning probe microscope for measurements and manufacturing on a scale of nanometer, and an optical detection device, and an optical detection method.

BACKGROUND ART

With latest STM (Scanning Tunneling Microscope), AFM (Atomic Force Microscope), and other SPM (Scanning Probe Microscope) techniques, one is able to make measurements and manufacturing even on a nanometer scale. Among SPMs, a near-field microscope which is able to detect optical characteristics in a tiny area below a diffraction limit is used in measurements and evaluations in biotechnology and other fields. Additionally, research and development are being made of optical recording devices and fine-manufacturing device employing the above technique of the near-field microscope.

In the near-field microscope, a fine structure of a size below the diffraction limit is used as a probe, and a front end of the probe is illuminated to generate near-field light in proximity of the front end of the probe. If the probe is driven to scan the surface of a sample under this condition, the near-field light is scattered due to the electric-magnetic interaction between the near-field light localized in proximity of the probe and the surface of the sample, or the near-field light transmits through the sample. By detecting the scatted near-field light or the near-field light transmitting through the sample, it is possible to obtain optical information of the sample surface, such as light intensity, spectrum, and polarization.

In the near-field microscope, usually, the optical probe includes an optical fiber having a core and a clad layer around the core; the core has a sharpened end which is projecting out from an end of the fiber, thus forming a projecting portion of the optical probe, and, for example, the projecting portion is covered by Au, Ag, or other metals. With such an optical probe, it is possible to obtain an optical image having resolution higher than the light wavelength.

When measuring material properties in a small area of the sample by using the above near-field optical microscope, the shape of the sample can be measured by detecting evanescent light localized in a tiny area of the sample smaller than the light wavelength. Then, the evanescent light, which is generated when the sample is illuminated by light under conditions of total reflection, is scattered by the above optical probe, thus, being converted into scattered light. The scattered light is guided into the core of the optical fiber through the projection portion, and is detected by a detector connected to the other end (emission end) of the optical fiber. Namely, the near-field optical microscope scatters the light and detects the scatted light with the optical probe.

In the related art, although the near-field optical microscope is capable of measurements at high resolution, it suffers from a problem in that the coverage of measurements is small, specifically, it is only a few tens micron meters.

Recently, in applications, such as, detect inspections of silicon wafers, it is required that a measurement at high resolution be made by using the near-field light after a measurement in a wide range using ordinarily propagating light is finished so as to measure and inspect the same sample successively. To meet this requirement, a detect inspection device is proposed, for example, in Japanese Laid Open Patent Application No. 2000-55818, in which an optical probe for detection of near-field light is provided in a common optical microscope having an object lens-based observation system.

In the detect inspection device, when measuring certain material properties in a specified tiny area of a wide region covered by the object lens, it is necessary to align the position of the optical probe for the near-field light detection with respect to the tiny area, and then the near-field light detection (high resolution measurement) is made. However, it is very difficult to make the alignment of the optical probe to the tiny area, and the measurement is quite time consuming.

DISCLOSURE OF THE INVENTION

It is a general object of the present invention to solve one or more of the problems of the related art.

A specific object of the present invention is to provide an optical fiber probe, an optical detection device, and an optical detection method allowing quick measurements using near-field light at high resolution and high efficiency but without necessity of position alignment of the optical fiber probe.

According to an embodiment of the present invention, there is provided an optical fiber probe, comprising: a core for propagating light from a light source, a front end surface of said core including a first exit section for emitting the propagating light and a second exit section for seeping out near-field light, said first exit section and said second exit section being formed in a concentric manner, wherein the first exit section is formed on a peripheral side, and a tilt angle of a normal of the first exit section relative to an optical axis of the propagating light is different from a tilt angle of a normal of the second exit section relative to the optical axis of the propagating light.

According to the present invention, it is possible to perform both a measurement in a wide range using the ordinarily propagating light and a measurement at high resolution using the near-field light with only one probe, and obtain a high Signal-to-Noise ratio in the high resolution measurement using the near-field light comparable to that in the wide range measurement using the ordinary light.

In addition, it is possible to efficiently collect light from the sample in the wide range measurement using the ordinary light, thus to reduce the measurement time.

These and other objects, features, and advantages of the present invention will become more apparent from the following detailed description of preferred embodiments given with reference to the accompanying drawings.

BEST MODE FOR CARRYING OUT THE INVENTION

Below, preferred embodiments of the present invention are explained with reference to the accompanying drawings.

In the present invention, in addition to an optical probe structure taking into consideration a structure is devised to improve the characteristics of the light spot of the near-field light, thereby, in high resolution measurements using the near-field light, resolution and light utilization can be further improved. Specifically, in the optical probe structure of the present invention, on the front end surface of the core of the optical probe, a first exit section for emitting the propagating light and a second exit section for seeping out near-field light are arranged in a concentric manner with the first exit section being on the peripheral side, and the tilt angles of the normal of the first exit section and the normal of the second exit section relative to the optical axis of the propagating light are different from each other.

Figure 1:
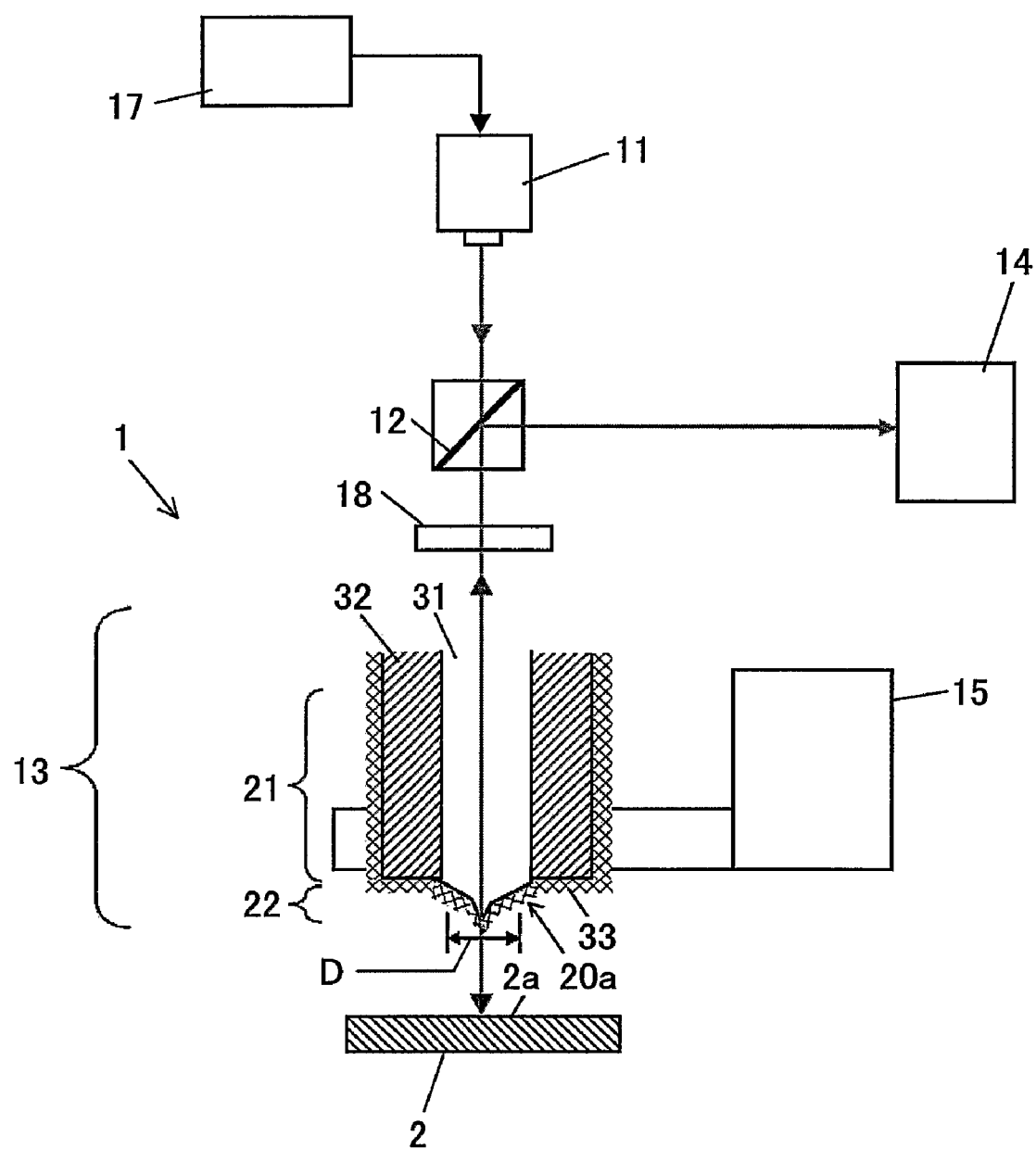
FIG. 1 is schematic view of an optical detection device 1 used in a near-field optical microscope according to an embodiment of the present invention.

First, a description is made of a basic configuration of an optical detection device and a measurement process using the optical detection device with respect to FIG. 1.

FIG. 1 is schematic view of an optical detection device 1 used in a near-field optical microscope according to an embodiment of the present invention.

For example, the optical detection device 1 shown in FIG. 1 can be used in a near-field optical microscope for measuring material properties in a small area of a sample.

As shown in FIG. 1, the optical detection device 1 includes a light source 11, a polarized beam splitter 12 arranged in the light path of the light from the light source 11, a ¼ wave plate 18 arranged in the light path of the light passing through the polarized beam splitter 12, an optical probe 13 for condensing the light passing through the ¼ wave plate 18 and illuminating on a surface 2a of a sample 2, and an optical detector 14 for detecting light returned from the sample surface 2a.

The light source 11 is driven by a not-illustrated power supplier to oscillate. A wavelength conversion unit 17 is connected to the light source 11 and is able to change the wavelength of the light emitted from the light source 11. The wavelength conversion unit 17 is used to control the diameter of the light spot of the light from the light source 11 by change the wavelength of the light.

The polarized beam splitter 12 allows the light from the light source 11 to pass through and directs the light to the sample surface 2a. At the same time, the polarized beam splitter 12 also reflects the light from the sample surface 2a and directs the light to the optical detector 14.

The light transmitting through the polarized beam splitter 12 enters into the ¼ wave plate 18.

The light from the light source 11 is linearly polarized. This linearly polarized light transmits through the ¼ wave plate 18 and is converted into circularly polarized light, and is incident into a core 31 of the optical probe 13.

The returning light reflected on the sample surface 2a, which is circularly polarized, passes through the ¼ wave plate 18 again and is converted into linearly polarized light but in a polarization direction different from that of the light from the light source 11, and this linearly polarized light is reflected by the polarized beam splitter 12.

It should be noted that a common beam splitter could be used instead of the polarized beam splitter 12.

The optical probe 13 includes a light guide portion 21 and a projecting portion 22 covered by a light-shielding layer 33. The light guide portion 21 is formed by an optical fiber including a core 31 and a clad layer 32 around the core 31. For example, the core 31 and the clad layer 32 are formed from silicon dioxide-based glass, and by adding germanium or phosphorous thereinto, the refractive index of the clad layer 32 is lower than that of the core 31.

The projecting portion 22 is formed a conic portion of the core 31 projecting out from the clad layer 32 at an end of the light guide portion 21. The projecting portion 22 includes a first taper portion 20a for emitting ordinarily propagating light and a second taper portion 20b for seeping out near-field light (Refer to FIG. 2).

The optical probe 13 includes a probe controller 15, corresponding to the "movement control unit" in claims of the present invention. For example, the probe controller 15 includes a three-axis actuator for moving the optical probe 13 to approach or depart from the sample surface 2a, or for driving the optical probe 13 to scan the sample surface 2a in a horizontal direction. Instead of moving the optical probe 13 to approach or depart from the sample surface 2a, the probe controller 15 may move the sample surface 2a to approach or depart from the optical probe 13.

The optical detector 14 receives the returning light from the sample surface 2a, and converts the light into electric signals to generate a brightness signal. An image is formed based on the brightness signal and is displayed on a not-illustrated display. A user can measure and observe details of the sample surface 2a by using the displayed image.

As for the method of detecting the returning light form the sample surface 2a, when the sample 2 is light transmissive, the optical detector 14 may be located opposite to the optical probe 13 with the sample 2 in between.

Figure 2:
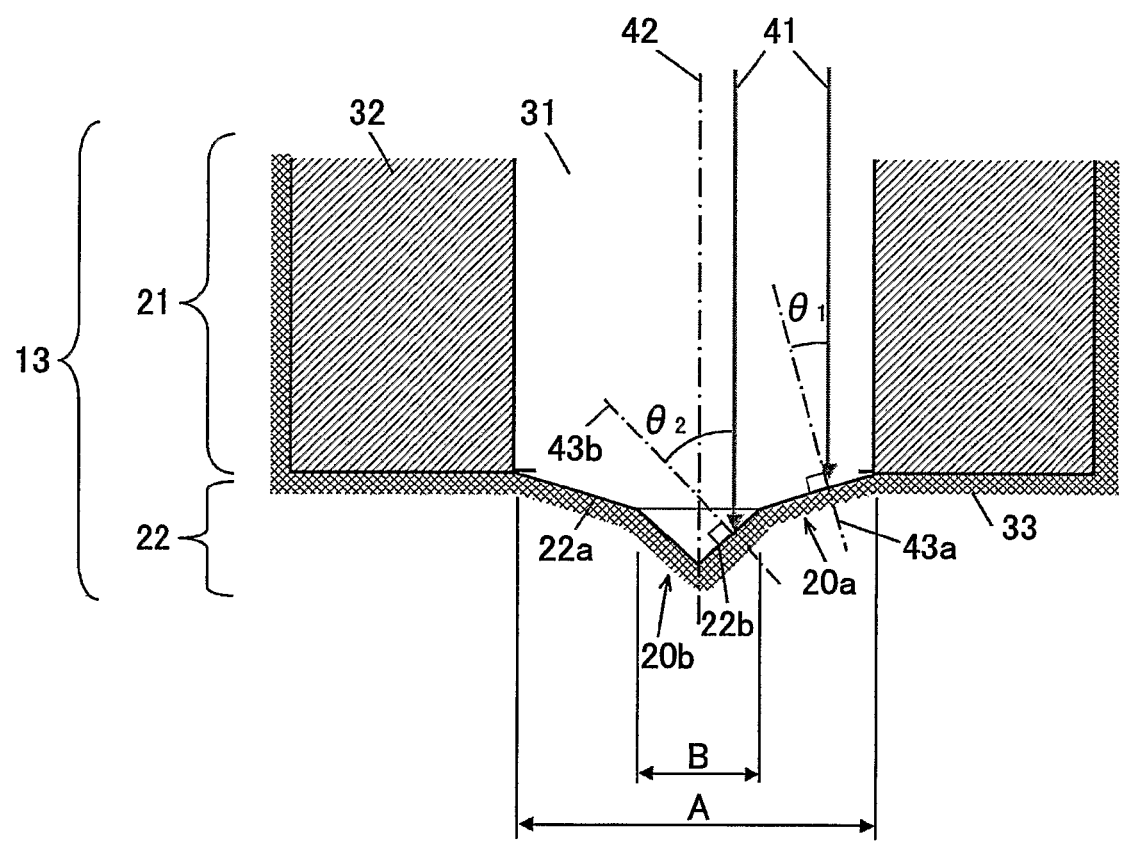
FIG. 2 is an enlarged schematic view of an example of the optical probe 13 in the optical detection device 1, in which the first taper portion has a conic shape.

FIG. 2 is an enlarged schematic view of an example of the optical probe 13 in the optical detection device 1, in which a first taper portion 22a has a conic shape.

First, a description is made of a structure of the first taper portion 20a for emitting the ordinary propagating light and characteristics of the light spot of the ordinary propagating light.

In FIG. 2, the ordinary propagating light 41, which propagates in the core 31, arrives at the first taper portion 20a, and is emitted out of the optical probe 13 from the first taper portion 20a.

Here, the surface 22a of the first taper portion 20a of the optical probe 13 is of a conic taper shape, and the normal 43a of the surface 22a and the optical axis 42 of the propagating light subtends an angle θ1. Below, the angle θ1 is referred to as a tilt angle θ1.

Preferably, the tilt angle θ1 is less than the total reflection angle of the propagating light 41 and is greater than zero degree.

With such a configuration, after transmitting through the light-shielding layer 33, a large portion of the light propagating in the optical probe 13 is refracted and is emitted out of the optical probe 13, and is focused at a position apart from the front end of the optical probe 13 by a few hundreds nm through a few μm, forming a light spot of high intensity.

The first taper portion 20a of the optical probe 13 may have other shapes, instead of the conic taper shape as shown in FIG. 2.

Figure 3:
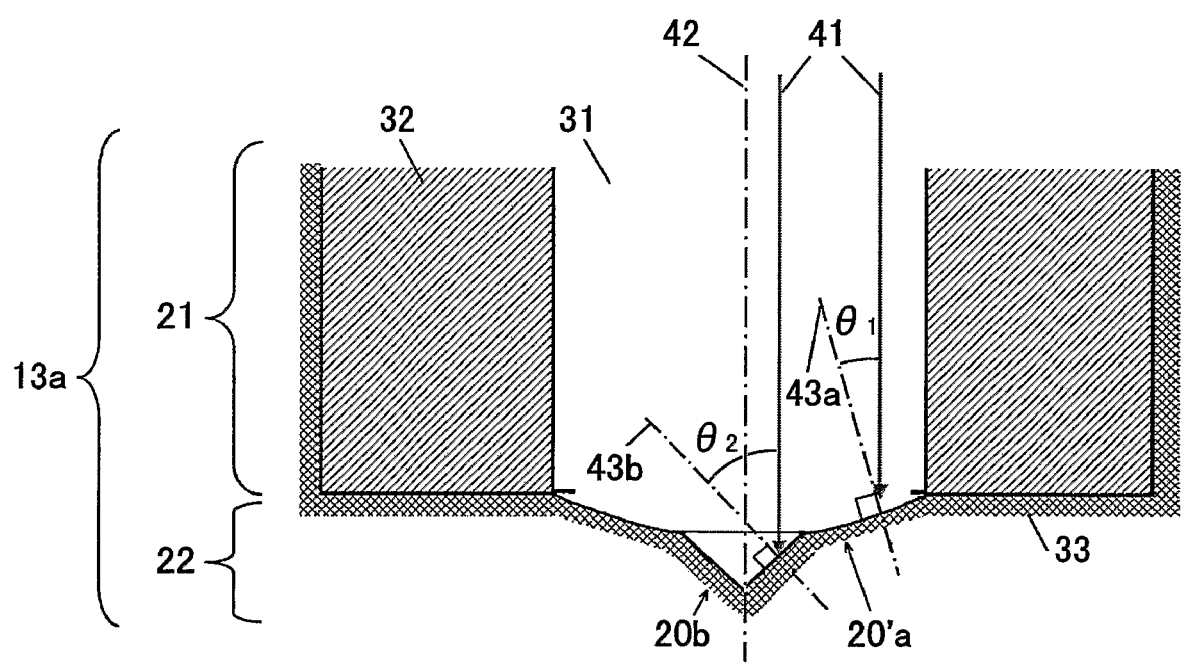
FIG. 3 is an enlarged schematic view of an optical probe 13a, in which the first taper portion is curved.

FIG. 3 is an enlarged schematic view of an optical probe 13a, in which the first taper portion is curved.

The reason why the light is focused at a position to form light spot of high intensity apart from the front end of the optical probe 13 is because the tilt angle θ1 is less than the total reflection angle of the propagating light 41. In the optical probe of the related art, the tilt angle θ1 is greater than the total reflection angle of the propagating light 41, the light intensity is at a maximum near the front end of the optical probe 13 and drops rapidly at positions far from the front end of the optical probe 13, thus, the light spot is of low light intensity.

The distance between the focused light spot and the front end of the optical probe 13 can be controlled by adjusting the tilt angle θ1 of the first taper portion 20a.

Figure 4:
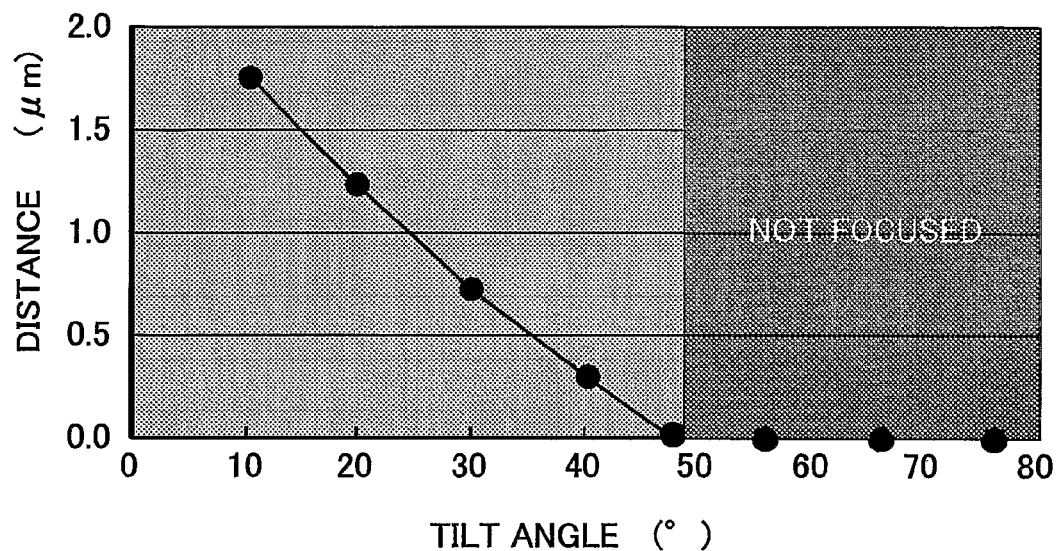
FIG. 4 is a graph exemplifying a relationship between the distance from the front end of the optical probe 13 to the focused light spot and the tilt angle θ1 of the first taper portion 20a of the optical probe 13.

FIG. 4 is a graph exemplifying a relationship between the distance from the front end of the optical probe 13 to the focused light spot and the tilt angle θ1 of the first taper portion 20a of the optical probe 13.

When the refractive index of the first taper portion 20a is 1.53, and the medium into which the light is emitted is air, the total reflection angle is 40°. As shown in FIG. 4, when the incidence angle (tilt angle) is less than 40°, the propagating light is focused, thus forming a light spot at a position apart from the front end of the optical probe 13 by a few hundreds nm through a few μm.

In addition, in order to form a light spot at a position apart from the front end of the optical probe 13, it is required that the ratio of the diameter B of the second taper portion 22b ratio and the diameter A of the first taper portion 22a (refer to FIG. 2) of the optical probe 13 be relatively small.

Figure 5:
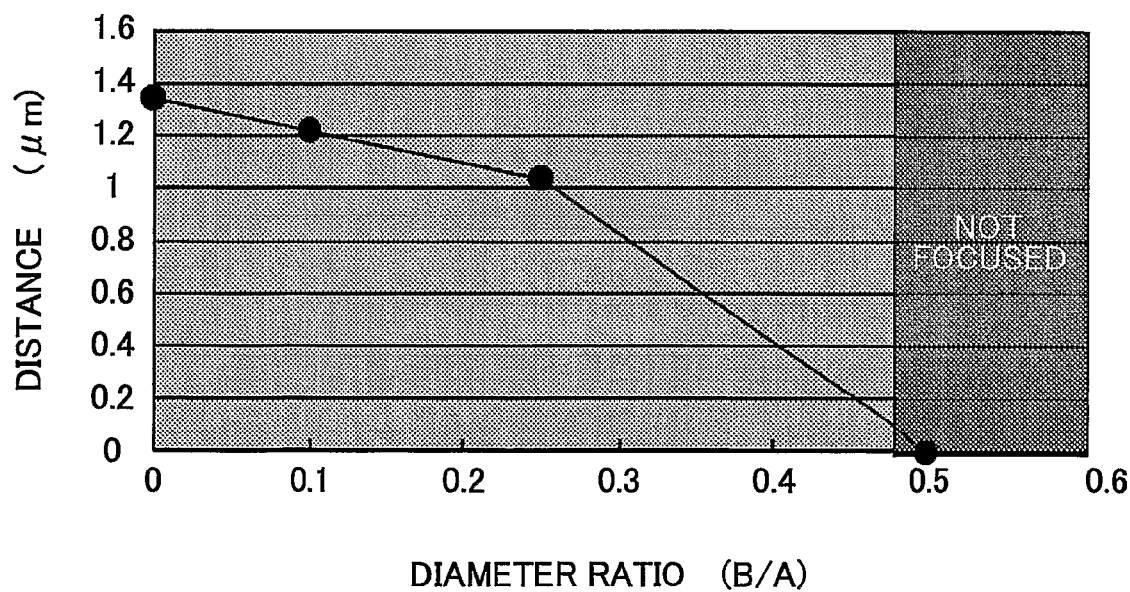
FIG. 5 is a graph exemplifying a relationship between the distance from the front end of the optical probe to the focused light spot and a diameter ratio (B/A) of the second taper portion 22b and the first taper portion 22a of the optical probe 13.

FIG. 5 is a graph exemplifying a relationship between the distance from the front end of the optical probe to the focused light spot and a diameter ratio (B/A) of the second taper portion 22b and the first taper portion 22a of the optical probe 13.

As shown in FIG. 5, when the diameter ratio (B/A) is less than 0.25, the propagating light is focused, thus forming a light spot at a position apart from the front end of the optical probe 13.

The diameter of the light spot can be controlled by adjusting the diameter D of the foot of the first taper portion 22a, the tilt angle θ1 of the first taper portion 20a, and the wavelength of the propagating light 41. For example, the diameter D of the foot of the first taper portion 22a, the tilt angle θ1 of the first taper portion 20a, and the wavelength of the propagating light can be adjusted so that the diameter of the light spot is comparable to required measurement resolution. Specifically, the diameter of the light spot can be reduced by reducing the diameter D of the foot of the first taper portion 22a, increasing the tilt angle θ1 of the first taper portion 20a, and reducing the wavelength of the propagating light 41.

Figure 6:
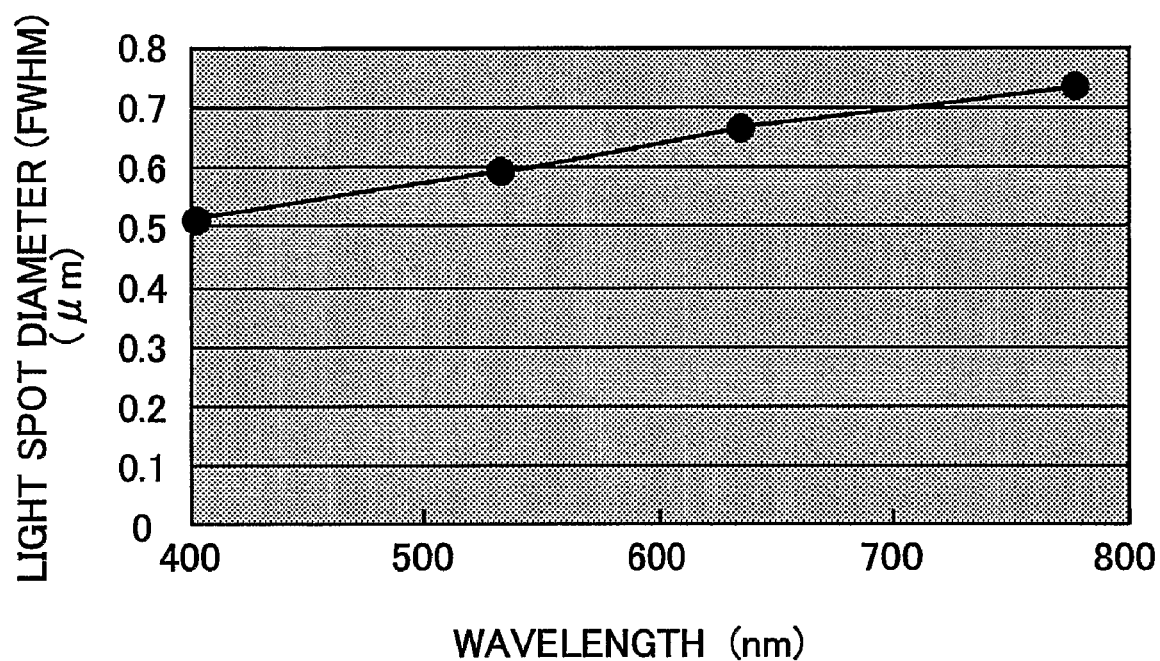
FIG. 6 is a graph exemplifying a relationship between the diameter of the light spot and the wavelength of the propagating light beam when the tilt angle θ1 of the first taper portion 22a of the optical probe 13 is 10°.

FIG. 6 is a graph exemplifying a relationship between the diameter of the light spot and the wavelength of the propagating light beam when the tilt angle θ1 of the first taper portion 22a of the optical probe 13 is 10°.

In the example shown in FIG. 6, light is emitted from the first taper portion 22a having a refractive index of 1.53 to the air. If the light spot diameter can be adjusted to be 0.4 μm (FWHM (Full Width at Half Maximum)) by setting the diameter D of the foot of the first taper portion 22a to 2 μm, the tilt angle θ1 of the first taper portion 20a to 20°, and the wavelength of the propagating light 41 to 0.4 μm. In this case, the distance from the front end of the optical probe to the focused light spot is 1.2 μm.

The light-shielding layer 33 arranged on the optical probe 13 is used for forming the light spot of the near-field light in measurements using the near-field light (high resolution measurements). The light-shielding layer 33 may be arranged on the optical probe 13 in various ways.

Figure 7:
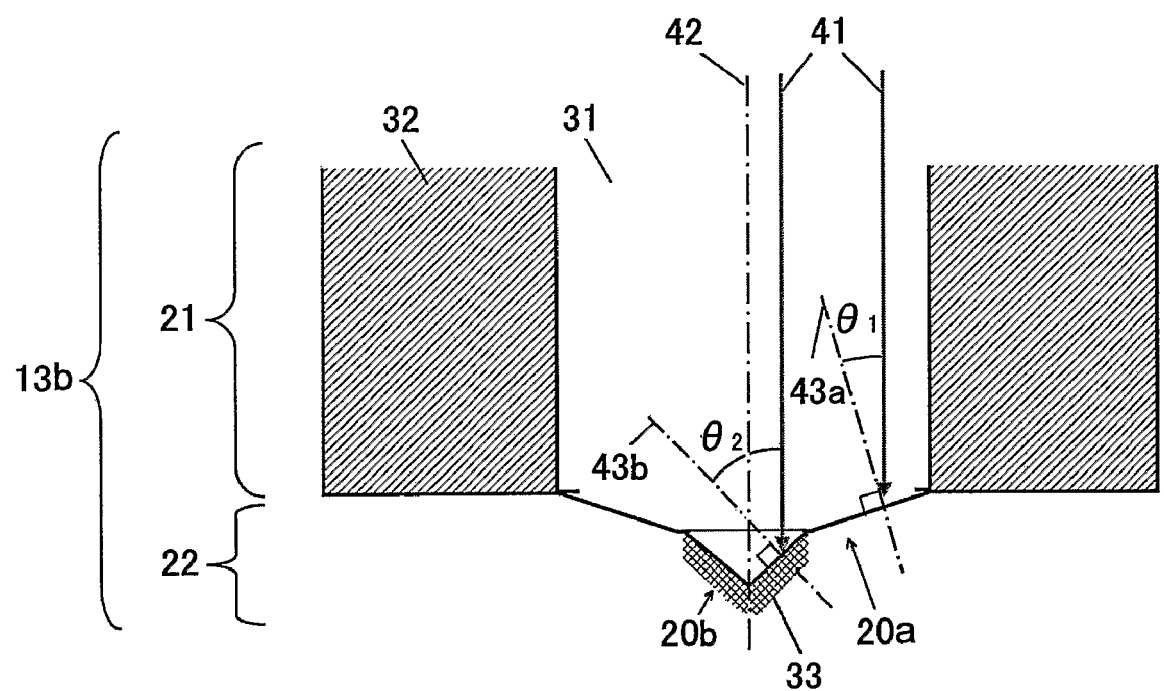
FIG. 7 is an enlarged schematic view of an optical probe 13b, in which the light-shielding layer 33 is provided only on the second taper portion 22b.

FIG. 7 is an enlarged schematic view of an optical probe 13b, in which the light-shielding layer 33 is provided only on the second taper portion 22b.

Generally, the optical probe 13 shown in FIG. 2 has relatively low intensity of the emitting light compared to the optical probe 13b shown in FIG. 7, but by adjusting the material and thickness of the light-shielding layer 33, and selecting the wavelength of the light from the light source 11, measurements can be made with the propagating light by using the optical probe 13.

For example, when the material of the light-shielding layer 33 is Au, and the thickness thereof is 80 nm, it has been confirmed that the light is focused at a position apart from the front end of the optical probe 13 by a few hundreds nm through a few μm, and a light spot of high intensity is formed.

Further, considering the dispersion characteristics associated with the birefringence property of the light-shielding layer 33, it is preferable to select the wavelength of the light from the light source 11 to be equal to or near a value resulting in a maximum light transmittance of the light-shielding layer 33. In doing so, it is possible to improve intensity of the light emitted from the optical probe 13.

Figure 8:
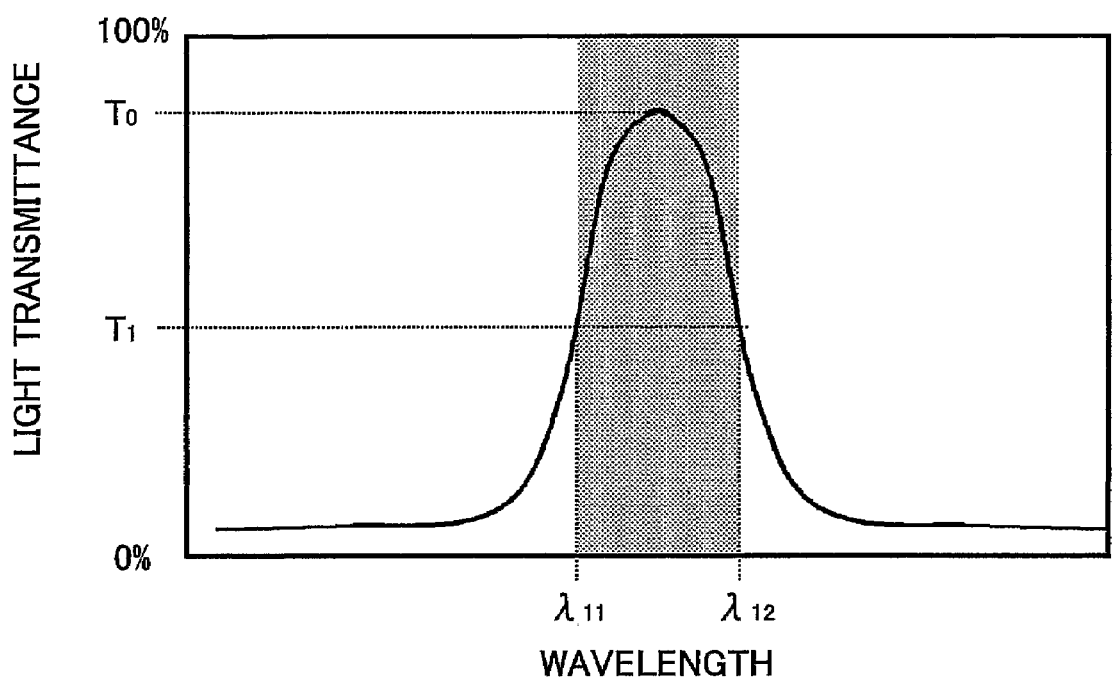
FIG. 8 is a graph showing a general light transmittance distribution, namely, a relationship between the light transmittance and the light wavelength.

FIG. 8 is a graph showing a general light transmittance distribution, namely, a relationship between the light transmittance and the light wavelength.

In FIG. 8, assume the maximum light transmittance is T0, and half of the maximum light transmittance is T1; the wavelengths corresponding to the light transmittance T1 are $\lambda_{11}$ and $\lambda_{12}$. Here, the wavelength approximately resulting in the maximum light transmittance T0 includes the wavelengths from the wavelength $\lambda_{11}$ to the wavelength $\lambda_{12}$ (the hatched region in FIG. 8). For example, when the material of the light-shielding layer 33 is Au, $\lambda_{11}$ is 480 nm and $\lambda_{12}$ is 700 nm.

Next, the structure of the second taper portion 20b of the optical probe 13 for seeping out the near-field light is described, again, with reference to FIG. 2.

As shown in FIG. 2, among the light 41 propagating in the core 31, a light component near the optical axis of the optical fiber arrives at the second taper portion 20b, and is incident to the second taper portion 20b.

Here, the surface 22b of the second taper portion 20b of the optical probe 13 has a conic taper shape, and the normal 43b of the surface 22b and the optical axis 42 of the propagating light subtends an angle θ2. Below, the angle θ2 is referred to as a tilt angle θ2.

Preferably, the tilt angle θ2 is greater than or equal to the total reflection angle of the propagating light 41 and is less than 90°.

In such a configuration, a large portion of the light propagating in the optical probe 13 is reflected on the interface between the light-shielding layer 33 and the core 31 of the optical probe 13, but a small portion of the light 41 transmits through the light-shielding layer 33 (this is described as "seep" here), and propagates along the light-shielding layer 33 to the front end of the optical probe 13, becoming local surface plasmon at the front end. Due to the surface plasmon obtained as described above, a light spot can be formed near the front end of the optical probe 13, this is referred to as near-field light spot.

The light-shielding layer 33 may be any material. In order to strengthen the near-field light generated by the surface plasmon, it is preferable to use an Au film. The Au film is also superior in chemical stability.

Figure 9:
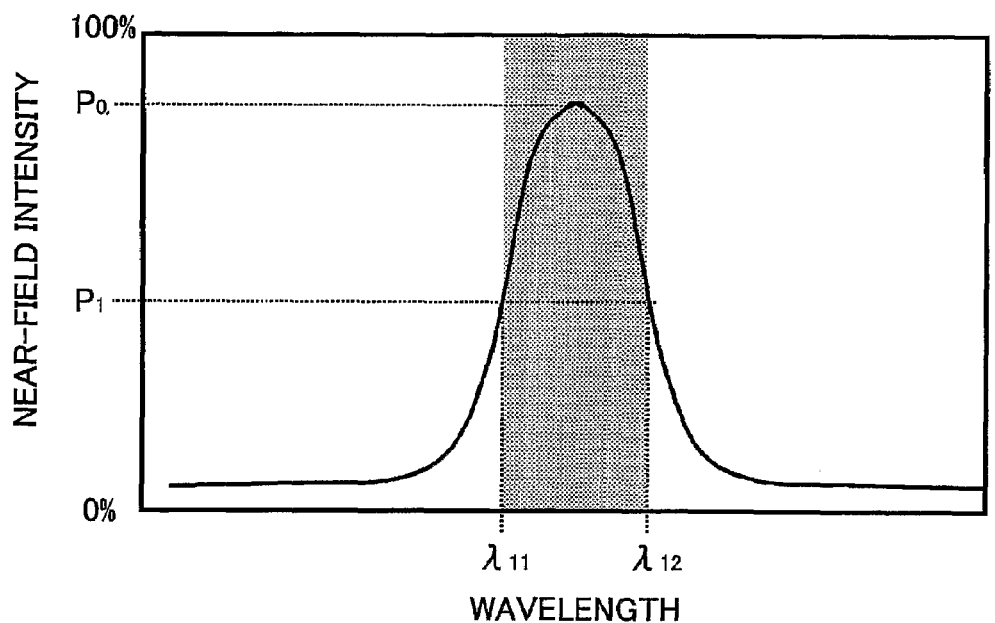
FIG. 9 is a graph showing a relationship between the near-field light intensity and the light wavelength when the light-shielding layer 33 is an Au film.

FIG. 9 is a graph showing a relationship between the near-field light intensity and the light wavelength when the light-shielding layer 33 is an Au film.

By selecting the wavelength of the incident light based on the dependence of the near-field light intensity on the light wavelength, it is possible to increase the intensity of the near-field light seeping out from the optical probe 13. For example, the wavelength approximately resulting in the maximum near-field light intensity P0 can be selected.

Generally, the distribution of the near-field light intensity exhibits a peak as shown in FIG. 9. Assume the maximum intensity of the near-field light is P0, and half of the maximum intensity is P1; the wavelengths corresponding to the light intensity P1 are $\lambda_{11}$ and $\lambda_{12}$.

Here, the wavelength approximately resulting in the maximum near-field light intensity P0 includes the wavelengths from the wavelength $\lambda_{11}$ to the wavelength $\lambda_{12}$ (the hatched region in FIG. 9), and wavelengths from $\lambda_{11}$ to $\lambda_{12}$ can be selected.

For example, when the light-shielding layer 33 is an Au film, $\lambda_{11}$ is about 480 nm and $\lambda_{12}$ is about 700 nm.

Figure 10:
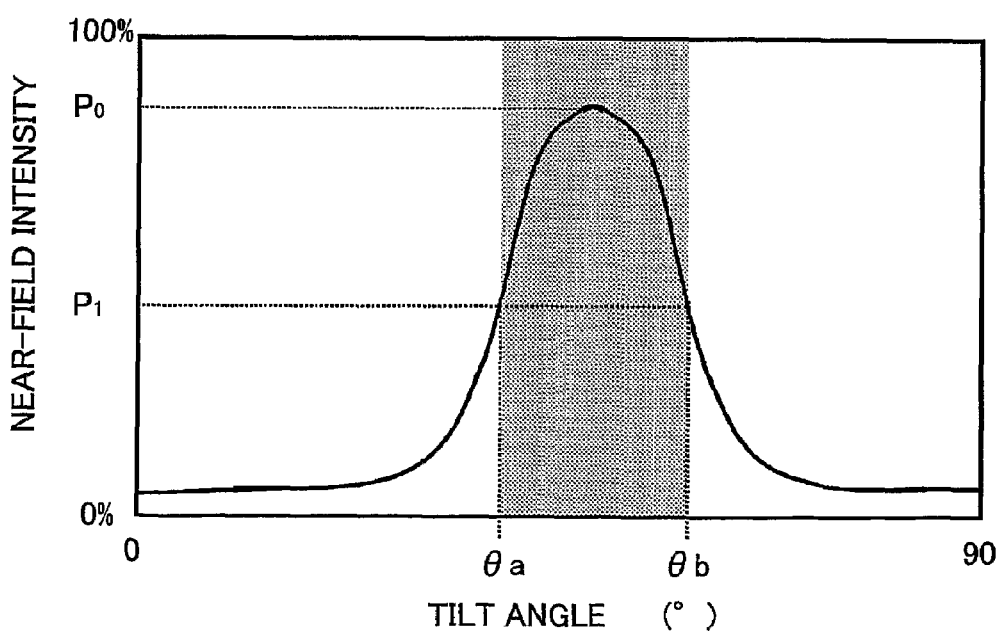
FIG. 10 is a graph showing a relationship between the near-field light intensity and the tilt angle θ2 of the second taper portion 22b.

FIG. 10 is a graph showing a relationship between the near-field light intensity and the tilt angle θ2 of the second taper portion 22b.

Similar to the descriptions of the dependence of the near-field light intensity on the light wavelength, the near-field light intensity also depends on the tilt angle θ2 of the second taper portion 22b. By selecting the wavelength of the incident light based on the dependence of the near-field light intensity on the tilt angle θ2 of the second taper portion 22b, it is possible to increase the intensity of the near-field light seeping out from the optical probe 13. For example, the tilt angle θ2 approximately resulting in the maximum near-field light intensity P0 can be selected.

Generally, the dependence of the near-field light intensity on the tilt angle θ2 exhibits a peak as shown in FIG. 10. Assume the maximum intensity of the near-field light is P0, and half of the maximum intensity P0 is P1; the tilt angles θ2 corresponding to the light intensity P1 are $\theta_a$ and $\theta_b$.

For example, Here, the tilt angle θ2 approximately resulting in the maximum near-field light intensity P0 is from the tilt angle $\theta_a$ to the tilt angle $\theta_b$ (the hatched region in FIG. 10), and the tilt angle from $\theta_a$ to $\theta_b$ can be selected.

For example, when the light-shielding layer 33 is an Au film, and the wavelength of the incident light is 532 nm, $\theta_a$ is about 45° and $\theta_b$ is about 55°.

The light-shielding layer 33 may be arranged on the optical probe 13 in further different ways from those in the optical probe 13, optical probe 13a, and optical probe 13b shown in FIG. 2, FIG. 3, and FIG. 7.

Figure 11:
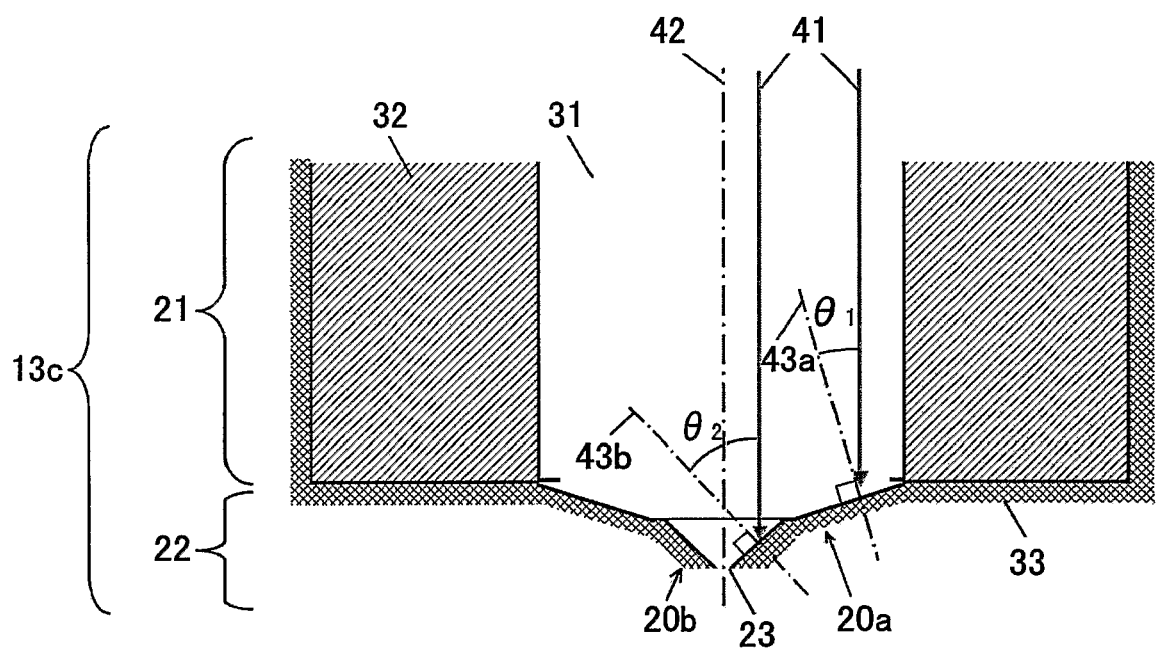
FIG. 11 is an enlarged schematic view of an example of an optical probe 13c, in which a front end portion of the second taper portion 22b is not covered by the light-shielding layer 33.

FIG. 11 is an enlarged schematic view of an example of an optical probe 13c, in which a front end portion of the second taper portion 22b is not covered by the light-shielding layer 33.

In FIG. 11, the second taper portion 22b, which is for seeping out near-field light, is not completely covered by the light-shielding layer 33, but the light-shielding layer 33 is not provided at the front end of the second taper portion 22b, leaving a small opening. With such a configuration, it is possible to form a high intensity light spot of the near-field light, enabling measurements of a high Signal-to-Noise Ratio (SNR).

Figure 12:
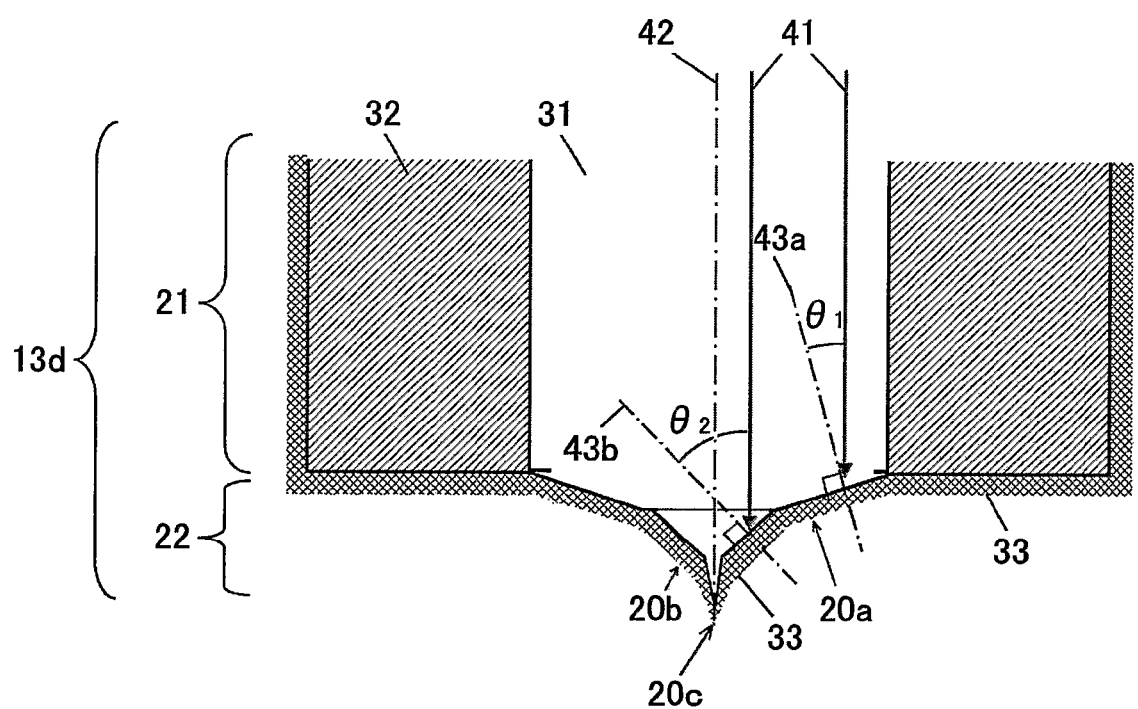
FIG. 12 is an enlarged schematic view of an example of an optical probe 13d in the optical detection device 1, which further includes a third taper portion 30c.

FIG. 12 is an enlarged schematic view of an example of an optical probe 13d in the optical detection device 1, which further includes a third taper portion 30c.

In the measurements using the near-field light (high resolution measurements), the measurement resolution is approximately determined by the curvature radius of the front end of the optical probe 13, and high measurement resolution is obtainable when the curvature radius of the front end is small.

Generally, in order to reduce the curvature radius of the front end of the optical probe 13, it is required that the optical probe 13 is highly sharpened. However, as described above, when the shape of the second taper portion 22b is adjusted to produce the maximum intensity of the near-field light, it becomes difficult to make the optical probe 13 sharp, and thus, with the optical probe 13 shown in FIG. 2, it is difficult to obtain both high intensity near-field light and high measurement resolution.

The optical probe 13d can be used to solve this problem, which further includes the third taper portion 30c, in addition to the components of the optical probe 13 in FIG. 2.

In FIG. 12, the tilt angle (not illustrated) of the third taper portion 30c is greater than the tilt angle $\theta_2$ of the second taper portion 22b and less than 90°. Preferably, the tilt angle of the third taper portion 30c is large, because the optical probe 13 becomes sharper.

Next, a measurement process with the optical detection device 1 having the above structure as shown in FIG. 1 is described.

First, a wide range measurement using the ordinary propagating light is described.

The light from the light source 11 including a linearly polarized light component transmits through the polarized beam splitter 12, the polarization state thereof is modified by the ¼ wave plate 18, then, the light is incident into the core 31 of the optical probe 13. The incident light propagates in the core 31, is emitted out from the optical probe 13, and is focused, and thus forms a light spot, at a position apart from the front end of the optical probe 13.

Then, the probe controller 15 moves the optical probe 13 to approach or depart from the sample surface 2a so as to locate the sample surface 2a at the position of the light spot. In this process of positioning the optical probe 13, it is necessary to information of the distance between the focused light spot and the front end of the optical probe 13, and this information can be measured experimentally in advance.

Next, the probe controller 15 drives the optical probe 13 to scan the sample surface 2a in the horizontal direction. In this step, the light emitted from the optical probe 13 is returned from the sample surface 2a, and the optical detector 14 receives the returning light, and generates a brightness signal, and based on the brightness signal, an image is formed and is displayed on a not-illustrated display. From the image, detailed material property information of the sample surface 2a is obtainable.

When the optical probe 13 scans the sample surface 2a in the horizontal direction, the optical probe 13 may be set at a specific height relative to the sample surface 2a. In doing so, it is not necessary to perform control in the direction of approaching and departing, and together with the information of the distance between the focused light spot and the front end of the optical probe 13 (a few hundreds nm to a few μm), it is possible to perform scanning at high speed, and thus reducing the measurement time greatly. Compared to near-field light measurements of the related art, since the measurement range per one point is large in the present invention, measurements in a wider range can be realized with the same number of measurement points or measurement lines.

Further, compared to the case in which the light emitted out from the optical probe 13 is not focused, in the present invention, it is possible to collect a relatively large amount of the returning light from the sample surface 2a, as a result, it is possible to obtain measurement results of high contrast due to an improved Signal-to-Noise ratio in measurements using the ordinary light.

Therefore, it is possible to provide an optical detection device capable of efficient light detection at high speed in the wide range measurement using the ordinary propagating light.

Next, a high resolution measurement using the near-field light is described.

The light from the light source 11 including a linearly polarized light component transmits through the polarized beam splitter 12, the polarization state thereof is modified by the ¼ wave plate 18, then, the light is incident into the core 31 of the optical probe 13. The incident light propagates in the core 31, and enters into the light-shielding layer 33 of the optical probe 13. In this step, at the exit end of the light-shielding layer 33, near-field light, which is evanescent light, seeps out. With the near-field light seeping out, the probe controller 15 moves the optical probe 13 to approach the sample surface 2a. At this moment, when the distance between the front end of the optical probe 13 and the sample surface 2a less than a quarter of the wavelength of the light from the light source 11, the near-field light seeping out from the optical probe 13 illuminates the sample surface 2a, and a tiny light spot of the near-field light is formed on the sample surface 2a. The near-field light forming the tiny light spot transmits through the light-shielding layer 33 and is directed to the optical detector 14 via the core 31. In this way, it is possible to perform a high resolution measurement on the sample surface 2a.

As described above, by moving the one optical probe 13 to approach or depart from the sample surface 2a, it is possible to selectively change the light spot of the near-field light and the light spot of the propagating light on the sample surface 2a, it is possible to perform both a wide range measurement using the propagating light and a high resolution measurement using the near-field light with only one optical probe.

In addition, in such a measurement system able to a high resolution measurement using the near-field light, it is not necessary to install a separate optical probe for the wide range measurement, thus the size of the system and the number of parts are reduced, and this reduces the cost of the system.

Next, a description is made of a process of performing a measurement at high resolution by using the near-field light after a measurement in a wide range by using the propagating light is finished so as to measure and inspect the same sample successively.

The light from the light source 11 including a linearly polarized light component transmits through the polarized beam splitter 12, the polarization state thereof is modified by the ¼ wave plate 18, then, the light is incident into the core 31 of the optical probe 13. The incident light propagates in the core 31, is emitted out from the optical probe 13, and is focused, and thus forms a light spot, at a position apart from the front end of the optical probe 13.

Then, the probe controller 15 moves the optical probe 13 to approach or depart from the sample surface 2a so as to locate the sample surface 2a at the position of the light spot. Information of the distance between the focused light spot and the front end of the optical probe 13, which is used in this process of positioning the optical probe 13, can be measured experimentally in advance.

Next, the probe controller 15 drives the optical probe 13 to scan the sample surface 2a in the horizontal direction. In this step, the light emitted from the optical probe 13 is returned from the sample surface 2a, and the optical detector 14 receives the returning light, and generates a brightness signal, and based on the brightness signal, an image is formed and is displayed on a not-illustrated display. From the image, detailed material property information of the sample surface 2a is obtainable.

From the optical material property information of the sample surface 2a obtained from the displayed image, the user specifies a tiny region in which more detailed measurements of the material property are desired. The optical probe 13 is moved in the horizontal direction to align the position of the optical probe 13 to the tiny region, and then the high resolution measurement using the near-field light, as described above, is performed.

In this way, the high resolution measurement using the near-field light is performed after the wide range measurement using the propagating light is finished to measure and inspect the same sample successively, it is not necessary to exchange the optical probe to be used, and the high resolution measurement can be performed with the same axis as the wide range measurement. Hence, it is possible to reduce workload of the user, and the high resolution measurement can be performed with the optical probe which has been already positioned precisely at the desired tiny region.

According to the present invention, the light propagating from the optical fiber to the optical probe is incident at an incidence angle less than the total reflection angle and is greater than zero, and is emitted out from the first exit section as ordinary light. Additionally, the light propagating from the optical fiber to the optical probe is incident at an incidence angle different from the incidence angle relative to the first exit section, and is seeped out from the second exit section. Because the intensity of the light emitted out from the optical probe is increased, a light spot of the ordinary light is formed at a position apart from the front end of the optical probe, and a light spot of the near-field light is formed at a position near the front end of the optical probe.

In addition, because the tilt angle of the normal of the second exit section relative to the optical axis of the propagating light is set to be greater than or equal to a total reflection angle of the propagating light and is less than 90 degrees, it is possible to form the light spot of strong near-field light near the front end of the optical probe.

In addition, because the second exit section includes the first portion and the second portion on the inner side of the first portion, the tilt angle of the normal of the second portion of the second exit section is greater than the tilt angle of the normal of the first portion and is less than 90 degrees, it is possible to reduce the curvature radius of the front end of the optical probe, hence, it is possible to generate strong near-field light near the front end of the optical probe, and improve the resolution in measurements using the near-field light.

Further, because the light spot of the ordinary light is formed apart from the front end of the optical probe, and the light spot of the near-field light is formed near the front end of the optical probe, it is possible to perform both a measurement in a wide range using the ordinary light and a measurement at high resolution using the near-field light with only one probe.

Because a wavelength control unit is provided to control the light wavelength based on the material and thickness of the light-shielding layer, the tilt angle of the normal of the first exit section, and the tilt angle of the normal of the second exit section, it is possible to obtain a desired light spot diameter, light intensity, and focus position in measurements using the ordinary light, further, it is possible to obtain high intensity of the near-field light in measurements using the near-field light.

In addition, it is possible to obtain detection signals of a high Signal-to-Noise ratio in measurements using the near-field light.

Further, it is possible to obtain a light spot of high intensity, and obtain measurement results of high contrast due to an improved Signal-to-Noise ratio in measurements using the ordinary light.

Because the tilt angle of the normal of the second exit section is adjusted so that intensity of the near-field light on the surface of the light-shielding layer in the second exit section is equal to or near a maximum while considering the material of the light-shielding layer and the wavelength of the incident light, it is possible to generate strong near-field light.

By further controlling the wavelength control unit using the wavelength control unit, it is possible to generate strong near-field light.

Further, it is possible to obtain a desired light spot diameter and a desired focus position.

It is possible to obtain both strong near-field light and high resolution, and to select appropriate measurement resolution.

Because the light from the sample can be collected efficiently in the wide range measurement using the ordinary light, it is possible to reduce the measurement time.

While the present invention is above described with reference to specific embodiments chosen for purpose of illustration, it should be apparent that the invention is not limited to these embodiments, but numerous modifications could be made thereto by those skilled in the art without departing from the basic concept and scope of the invention.

This patent application is based on Japanese Priotity Patent Application No. 2005-029652 filed on Feb. 4, 2005, the entire contents of which are hereby incorporated by reference.

The invention claimed is:

1. An optical fiber probe, comprising:
a core configured to propagate light from a light source, a front end surface of said core including a first exit section configured to emit the propagating light and a second exit section configured to seep out near-field light, said first exit section and said second exit section being disposed in a concentric manner,
wherein
a tilt angle of a normal of the first exit section relative to an optical axis of the propagating light is different from a tilt angle of a normal of the second exit section relative to the optical axis of the propagating light,
the first exit section extends from a peripheral side of the optical fiber probe and projects immediately outward, at least partially in a direction parallel to the optical axis, from an edge of a clad layer at an end of a light guide portion in the core, and
the tilt angle of the normal of the second exit section is about 45 to 55 degrees.

2. The optical fiber probe as claimed in claim 1, wherein the tilt angle of the normal of the first exit section relative to the optical axis of the propagating light is less than a total reflection angle of the propagating light and is greater than zero.

3. The optical fiber probe as claimed in claim 1, wherein the tilt angle of the normal of the second exit section relative to the optical axis of the propagating light is greater than or equal to a total reflection angle of the propagating light and is less than 90 degrees.

4. The optical fiber probe as claimed in claim 1, wherein
the second exit section includes a first portion and a second portion on an inner side of the first portion,
a tilt angle of a normal of the first portion of the second exit section relative to the optical axis of the propagating light is greater than or equal to a total reflection angle of the propagating light and is less than 90 degrees, and
a tilt angle of a normal of the second portion of the second exit section relative to the optical axis of the propagating light is greater than the tilt angle of the normal of the first portion and is less than 90 degrees.

5. The optical fiber probe as claimed in claim 1, wherein the first exit section is curved when viewed along an axis perpendicular to an axis of the core.

6. The optical fiber probe as claimed in claim 1, wherein the tilt angle of the normal of the first exit section is shaped to control a distance between the front end surface of said core and a focused light spot of the propagating light disposed on a surface of a sample such that the distance between the front end surface of said core and the focused light spot is less than 2 μm.

7. An optical fiber probe, comprising:
a core configured to propagate light from a light source, a front end surface of said core being covered by a light-shielding layer configured to seep out near-field light, the front end surface of said core including a first exit section configured to emit the propagating light and a second exit section configured to seep out the near-field light, said first exit section and said second exit section being disposed in a concentric manner,
wherein
a tilt angle of a normal of the first exit section relative to an optical axis of the propagating light is different from a tilt angle of a normal of the second exit section relative to the optical axis of the propagating light,
the first exit section extends from a peripheral side of the optical fiber probe and projects immediately outward, at least partially in a direction parallel to the optical axis, from an edge of a clad layer at an end of a light guide portion in the core, and
the tilt angle of the normal of the second exit section is about 45 to 55 degrees.

8. An optical detection device, comprising:
a light source;
an optical fiber probe including a core configured to propagate light from the light source, an optical probe being disposed at a front end of said core;
a movement control unit configured to move the optical fiber probe and a surface of a sample to approach or depart from each other so that a light spot of the propagating light or near-field light seeping out from the front end of the core is disposed on the surface of the sample; and a detection unit configured to detect light from the surface of the sample, wherein the optical probe includes a first exit section on the front end surface of the core configured to emit the propagating light and a second exit section on the front end surface of the core configured to seep out the near-field light, the first exit section and the second exit section are disposed in a concentric manner, a tilt angle of a normal of the first exit section relative to an optical axis of the propagating light is different from a tilt angle of a normal of the second exit section relative to the optical axis of the propagating light, the first exit section extends from a peripheral side of the optical fiber probe and projects immediately outward, at least partially in a direction parallel to the optical axis, from an edge of a clad layer at an end of a light guide portion in the core, and the tilt angle of the normal of the second exit section is about 45 to 55 degrees.

9. The optical detection device as claimed in claim 8, wherein the tilt angle of the normal of the first exit section relative to the optical axis of the propagating light is less than a total reflection angle of the propagating light and is greater than zero.

10. The optical detection device as claimed in claim 8, wherein the tilt angle of the normal of the second exit section relative to the optical axis of the propagating light is greater than or equal to a total reflection angle of the propagating light and is less than 90 degrees.

11. The optical detection device as claimed in claim 8, wherein the second exit section includes a first portion and a second portion on an inner side of the first portion, a tilt angle of a normal of the first portion of the second exit section relative to the optical axis of the propagating light is greater than or equal to a total reflection angle of the propagating light and is less than 90 degrees, and a tilt angle of a normal of the second portion of the second exit section relative to the optical axis of the propagating light is greater than the tilt angle of the normal of the first portion and is less than 90 degrees.

12. The optical detection device as claimed in claim 8, wherein the tilt angle of the normal of the first exit section is adjusted so that a shape of the light spot becomes a predetermined shape.

13. The optical detection device as claimed in claim 8, wherein a diameter of the optical probe is adjusted so that a shape of the light spot of the light propagating in the core becomes a predetermined shape.

14. The optical detection device as claimed in claim 8, wherein the tilt angle of the normal of the first exit section and a diameter of the optical probe are adjusted so that a shape of the light spot of the light propagating in the core becomes a predetermined shape.

15. An optical detection device, comprising:
a light source;
an optical fiber probe including a core configured to propagate light from the light source, an optical probe being disposed at a front end of said core, the front end surface of said core being covered by a light-shielding layer configured to seep out near-field light;

a movement control unit configured to move the optical fiber probe and a surface of a sample to approach or depart from each other so that a light spot of the propagating light or near-field light seeping out from the front end of the core is disposed on the surface of the sample; and a detection unit configured to detect light from the surface of the sample, wherein the optical probe includes a first exit section on the front end surface of the core configured to emit the propagating light and a second exit section on the front end surface of the core configured to seep out the near-field light, the first exit section and the second exit section are disposed in a concentric manner, a tilt angle of a normal of the first exit section relative to an optical axis of the propagating light is different from a tilt angle of a normal of the second exit section relative to the optical axis of the propagating light, the first exit section extends from a peripheral side of the optical fiber probe and projects immediately outward, at least partially in a direction parallel to the optical axis, from an edge of a clad layer at an end of a light guide portion in the core, and the tilt angle of the normal of the second exit section is about 45 to 55 degrees.

16. The optical detection device as claimed in claim 15, further comprising:

a wavelength control unit configured to control a wavelength of the light from the light source to be a predetermined wavelength based on a material and a thickness of the light-shielding layer, the tilt angle of the normal of the first exit section, and the tilt angle of the normal of the second exit section.

17. The optical detection device as claimed in claim 16, wherein the predetermined wavelength is equal to or near a value resulting in a maximum intensity of the near-field light on a surface of the light-shielding layer.

18. The optical detection device as claimed in claim 16, wherein the predetermined wavelength is equal to or near a value resulting in a maximum light transmittance of the light-shielding layer.

19. The optical detection device as claimed in claim 15, wherein the tilt angle of the normal of the second exit section is adjusted so that intensity of the near-field light on a surface of the light-shielding layer in the second exit section is equal to or near a maximum.

20. The optical detection device as claimed in claim 15, further comprising:

a wavelength control unit configured to control a wavelength of the light from the light source, wherein the wavelength control unit is controlled and the tilt angle of the normal of the second exit section is adjusted so that intensity of the near-field light on a surface of the light-shielding layer in the second exit section is equal to or near a maximum.

21. An optical detection method, comprising the steps of:
propagating light from a light source to a core of an optical fiber probe, said optical fiber probe including an optical probe being disposed at a front end of the core, the optical probe including a first exit section on the front end surface of the core configured to emit the propagating light and a second exit section on the front end surface configured to seep out the near-field light, the first exit section and the second exit section being disposed in a concentric manner, a tilt angle of a normal of the first exit section relative to an optical axis of the propagating light being different from a tilt angle of a normal of the second exit section relative to the optical axis of the propagating light, the first exit section extending from a peripheral side of the optical fiber probe and projecting immediately outward, at least partially in a direction parallel to the optical axis, from an edge of a clad layer at an end of a light guide portion in the core, the tilt angle of the normal of the second exit section is about 45 to 55 degrees;

moving the optical fiber probe and the surface of the sample to approach or depart from each other so that the light spot of the propagating light or near-field light seeping out from the front end of the core is formed on the surface of the sample; and detecting light from the surface of the sample.

22. An optical detection method, comprising the steps of:

propagating light from a light source to a core of an optical fiber probe, said optical fiber probe including an optical probe being disposed at a front end of the core, the optical probe including a first exit section on the front end surface of the core configured to emit the propagating light and a second exit section on the front end surface configured to seep out the near-field light, the first exit section and the second exit section being disposed in a concentric manner, a tilt angle of a normal of the first exit section relative to an optical axis of the propagating light being different from a tilt angle of a normal of the second exit section relative to the optical axis of the propagating light, the first exit section extending from a peripheral side of the optical fiber probe and projecting immediately outward, at least partially in a direction parallel to the optical axis, from an edge of a clad layer at an end of a light guide portion in the core, the tilt angle of the normal of the second exit section is about 45 to 55 degrees, and at least the second exit section of the front end surface being covered by a light-shielding layer configured to seep out near-field light;

moving the optical fiber probe and the surface of the sample to approach or depart from each other so that the light spot of the propagating light or the near-field light seeping out from the front end of the core is formed on the surface of the sample; and detecting light from the surface of the sample.

23. The method as claimed in claim 22, further comprising a step of:

controlling a wavelength of the light from the light source to be a predetermined wavelength based on a material and a thickness of the light-shielding layer, the tilt angle of the normal of the first exit section, and the tilt angle of the normal of the second exit section.

* * * * *

UNITED STATES PATENT AND TRADEMARK OFFICE
CERTIFICATE OF CORRECTION

PATENT NO. : 7,586,084 B2
APPLICATION NO. : 11/547032
DATED : September 8, 2009
INVENTOR(S) : Izumi Itoh et al.

It is certified that error appears in the above-identified patent and that said Letters Patent is hereby corrected as shown below:

Title Page, Item 86, change "PCT/JP2006/002205" to --PCT/JP2006/302205--.

Signed and Sealed this

Seventeenth Day of November, 2009

David J. Kappos
*Director of the United States Patent and Trademark Office*